United States Patent [19]

Tasset

[11] Patent Number: 4,808,440

[45] Date of Patent: Feb. 28, 1989

[54] PROCESS FOR THE SURFACE TREATMENT OF POLYMER ARTICLES TO PROVIDE FOR BETTER ADHERENCE OF PAINTS

[75] Inventor: Emmett L. Tasset, Lake Jackson, Tex.

[73] Assignee: The Dow Chemical Company, Midland, Mich.

[21] Appl. No.: 114,322

[22] Filed: Oct. 28, 1987

[51] Int. Cl.[4] .......................... B05D 1/02; B05D 1/18; B05D 1/28; B05D 7/02
[52] U.S. Cl. .................................. 427/372.2; 427/307
[58] Field of Search ............ 427/316, 444, 307, 372.2

[56] References Cited

U.S. PATENT DOCUMENTS

| | | |
|---|---|---|
| 3,607,536 | 9/1971 | Bragele . |
| 3,697,306 | 10/1972 | Miller .................................. 427/307 |
| 3,869,303 | 3/1975 | Orlov et al. ........................ 427/444 |
| 4,472,467 | 9/1984 | Tamaki et al. ..................... 427/444 |
| 4,567,241 | 1/1986 | Kitchens et al. . |
| 4,613,653 | 9/1986 | Kitchens et al. . |
| 4,731,262 | 3/1988 | Ohno et al. ........................ 524/104 |

*Primary Examiner*—Allan M. Lieberman
*Attorney, Agent, or Firm*—A. Cooper Ancona

[57] ABSTRACT

Polyurethane articles of manufacture are treated so as to make their surfaces more adherent to paint by contacting the surfaces of the articles with a solution of phosphoric acid in a low molecular weight organic solvent, e.g. a carboxylic acid ester such as ethyl acetate. The treated article is then dried at an elevated temperature.

14 Claims, No Drawings

PROCESS FOR THE SURFACE TREATMENT OF POLYMER ARTICLES TO PROVIDE FOR BETTER ADHERENCE OF PAINTS

BACKGROUND OF THE INVENTION

Items of manufacture made of polyurethane without some treatment to improve adherence of paint, do not accept paint readily. The paint does not adhere well to the surfaces of such items and chips, cracks and peels during use. At present polyurethane manufactures are treated in a number of ways to make paint adhere more readily to their surfaces. One method involves washing with an aqueous acid wash, another a wash with aqueous caustic. Yet another treatment is to provide thiocyanate or isothiocyanate functionality on the surface of such items by reacting with thiocyanogen, $(SCN)_2$. Such a process is disclosed in U.S. Pat. Nos. 4,567,241 and 4,613,653.

The present invention provides an effective, but less expensive treatment for obtaining better paint adherence to articles made of polyurethane.

SUMMARY OF THE INVENTION

Polyurethane articles of manufacture are made to accept paint more readily by treating the surfaces of such articles with a solution of phosphoric acid ($H_3PO_4$) in an organic solvent, e.g. a low molecular weight carboxylic acid ester such as ethyl acetate. The treated article is then heated to dry its surface.

DETAILED DESCRIPTION OF THE INVENTION

Solutions of phosphoric acid in various organic solvents may be used to treat polyurethane to make it accept paint more readily. Solvents which may be used include organic esters, ketones and alcohols. The lower molecular weight species are preferred. Thus, esters in which the alcohol moiety contains from two to six carbon atoms and the acid moiety contains from two to four carbon atoms, ketones having from three to nine carbon atoms and alcohols having from two to six carbon atoms are useful.

Specific compounds useful as solvents include esters such as ethyl acetate, propyl acetate, ethyl propionate, butyl propionate, ethyl butyrate and the like. Ketones such as acetone, methyl ethyl ketone, diethyl ketone, ethyl propyl ketone and alcohols such as ethanol, propanol, 1-butanol, and 2-pentanol are also useful.

The amount of acid in the solution may vary from about 0.1 to about 1.0 percent based on the weight of the total solution. There is no advantage to using solutions stronger than one percent. At less than 0.1 percent concentration the length of treatment is prolonged and/or a larger volume of solution must be used.

The polyurethane item may be contacted with the acid solution in a number of ways. It may be dipped into a vat containing the solution, it may be sprayed with the solution or the solution may be brushed on its surface. The length of time of contact with the solution should be a minimum of about 10 seconds, preferably at least 15 seconds. This appears to be sufficient time for the treatment to penetrate the surface to an extent to provide the properties necessary for good paint adherence. Longer contact is unnecessary, but will not be deleterious.

Following the treatment with the acid, the treated article is dried by heating at a temperature in the range of from about 100° to about 150° C., preferably about 110° to 120° C. A time sufficient to dry the article is usually from about five minutes to about 20 minutes, depending on the temperature employed. A time of from 10 to 15 minutes is usually adequate at the preferred temperatures.

The following example illustrates the invention.

EXAMPLE 1

A solution of $H_3PO_4$ (0.2% by weight) in ethyl acetate was prepared and a rectangular strip of reaction injection molded (RIM) polyurethane, having dimensions of $3'' \times \frac{5}{8}'' \times \frac{1}{8}''$, was dipped into a container of the solution and left there for 15 seconds. It was then removed, drained and air dried for 10 minutes and then placed in an oven at a temperature of 110° C. for 10 minutes to completely dry the strip. After removing from the oven it was allowed to cool to room temperature and placed on a paper towel.

The following test was performed to determine wettability, which correlates with paint adherence, i.e. better wetting of the surface produces better adherance:

From a 25-$\mu$L syringe 5.0 $\mu$L of a polyglcol (Dowanol* EM), having a molecular weight (Mw) of about 76, was placed on the horizontal surface of the treated polyurethane. Five seconds after the polyglcol was placed on the surface, the polyurethane strip was turned to a vertical position to allow the polyglycol to run down the face of the strip. If there was little or no flow of the polyglycol on the surface, the indication was that the surface was not "wetted" and adhesion of paint would not be improved, i.e. the treatment was unsucussful. If, however, there was a movement of at least 0.5 inch down the strip, the treatment was effective in wetting the surface of the polyurethane.

* Trademark of The Dow Chemical Company for glycol ethers.

The polyurethane strip which was treated in the above manner was shown to be effective by the above test when conducted two hours after the treatment and again 50 days after the treatment. A polyurethane strip of the same material which was treated in the same manner, but with a 0.2 percent phosphoric acid aqueous solution, did not pass the above test when conducted two hours after the treatment.

I claim:

1. A process for treating the surface of a polyurethane article to provide a surface to which paint will adhere more readily which comprises contacting the surface of said article for a minimum of 10 seconds with a solution of phosphoric acid in an organic solvent, said solvents being selected from lower molecular weight esters, ketones and alcohols, and said phosphoric acid being present in said solvent at a concentration within the range of from about 0.1 to about 1.0 weight percent, subsequently heating at an elevated temperature for a time sufficient to dry the so-treated article.

2. The process of claim 1 wherein the solvent is an alcohol having from two to six carbon atoms.

3. The process of claim 2 wherein the alcohol is ethanol, propanol, 1-butanol, or 2-pentanol.

4. The process of claim 1 wherein the solvnt is a ketone having from three to nine carbon atoms.

5. The process of claim 4 wherein the ketone is acetone, methyl ethyl ketone, diethyl ketone, or ethyl propyl ketone.

6. The process of claim 1 wherein solvent is an ester having from four to ten carbon atoms.

7. The process of claim 6 wherein the ester moiety of the ester contains two to four carbon atoms and the alcohol moiety contains two to six atoms.

8. The process of claim 7 wherein the ester is ethyl acetate, propyl acetate, ethyl propionate, butyl propionate or ethyl butyrate.

9. The process of claim 1 wherein the organic solvent-phosphoric acid solution is in contact with the article for a minimum of 15 seconds.

10. The process of claim 8 wherein the article is dried at a temperature of from about 100° to about 150° C.

11. The process of claim 10 wherein the article is dried at a temperature of from about 110° to about 120° C.

12. The process of claim 10 wherein the article is heated for a period of from about five to about 20 minutes.

13. The process of claim 11 wherein the article is heated for a period of from about 10 to about 15 minutes.

14. The process of claim 13 wherein the solvent is ethyl acetate.

* * * * *